Figure 1:
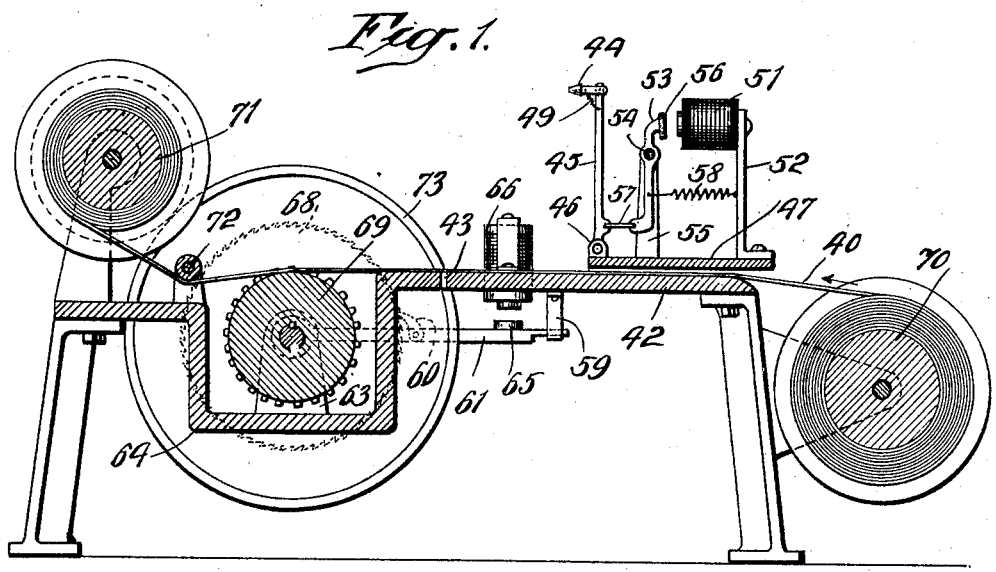

E. VIOLLET.
RECORDING APPARATUS.
APPLICATION FILED MAY 5, 1919.

1,397,710.

Patented Nov. 22, 1921.
4 SHEETS—SHEET 1.

INVENTOR
Eugene Viollet
BY Archibald Cox
his ATTORNEY

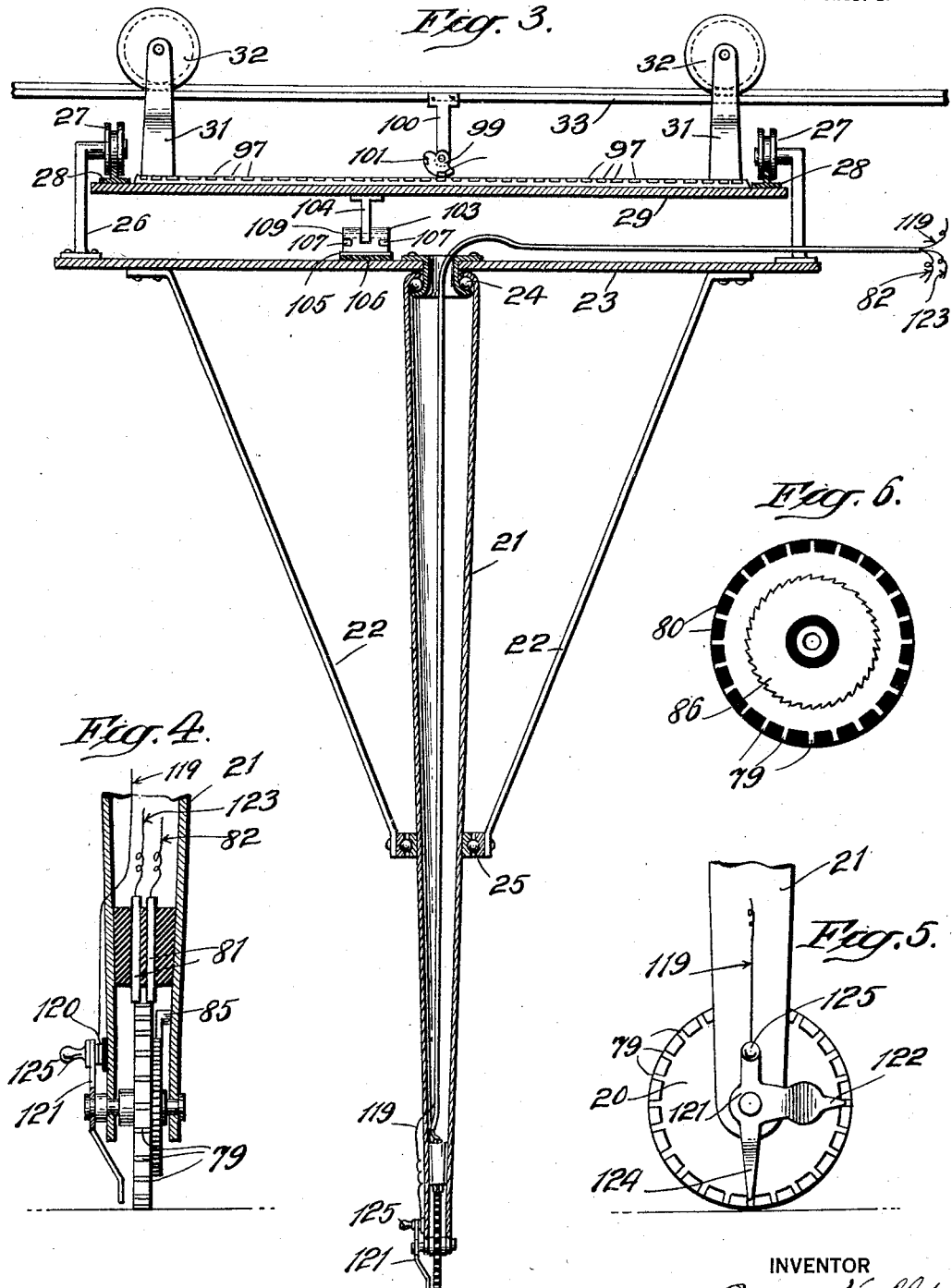

E. VIOLLET.
RECORDING APPARATUS.
APPLICATION FILED MAY 5, 1919.
1,397,710.
Patented Nov. 22, 1921.
4 SHEETS—SHEET 3.
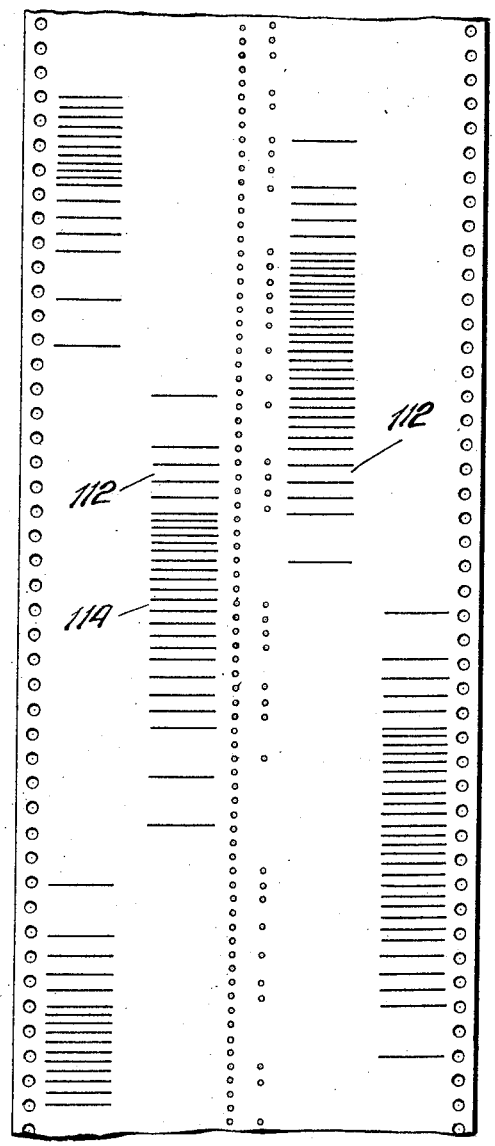
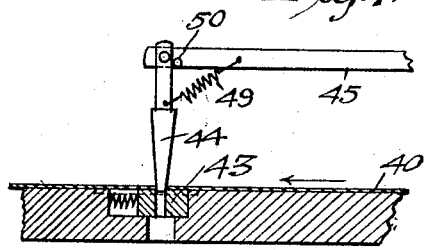
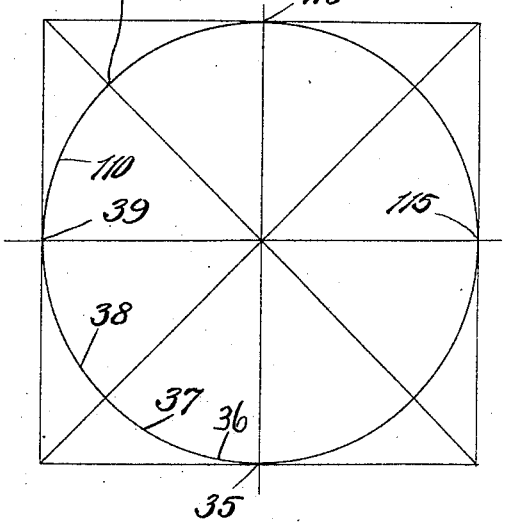
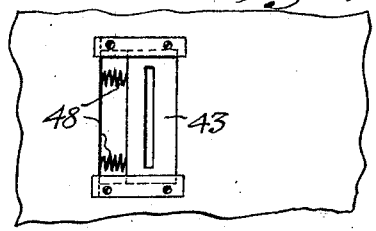
INVENTOR
Eugene Viollet
BY Archibald Cox
his ATTORNEY

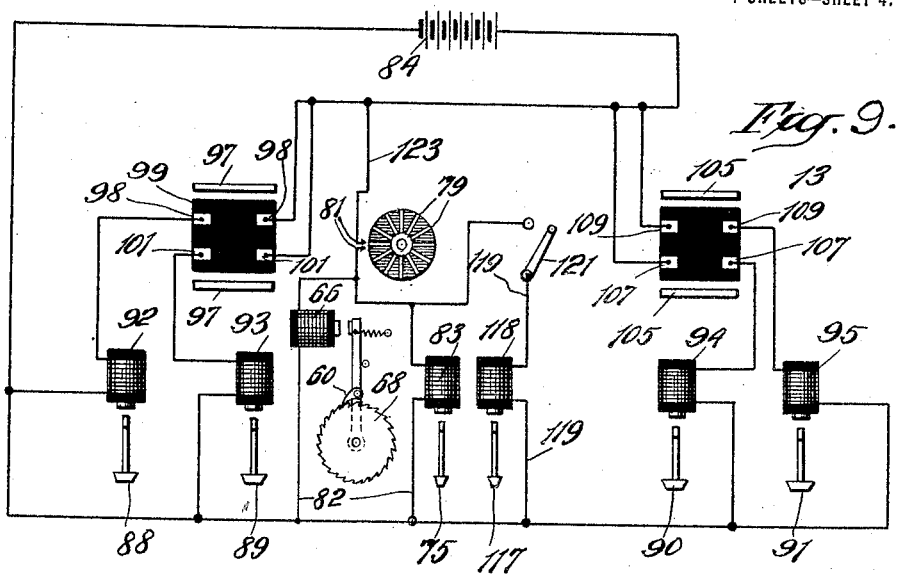

UNITED STATES PATENT OFFICE.

EUGÈNE VIOLLET, OF LIMOGES, FRANCE.

RECORDING APPARATUS.

1,397,710. Specification of Letters Patent. Patented Nov. 22, 1921.

Application filed May 5, 1919. Serial No. 294,917.

*To all whom it may concern:*

Be it known that I, EUGÈNE VIOLLET, a citizen of the Republic of France, and a resident of Limoges, in the Republic of France, have invented certain new and useful Improvements in Recording Apparatus, of which the following is a specification.

The present invention relates to a recording apparatus.

The object of the invention is to record the variations in the rate of speed of a movable object, whether that object moves in place or is displaced by its movement, so that the variations in the speed and movement of the object may be reproduced. Where the object is displaced, it will travel in a certain direction for a given period of time and at a given or varying rate of speed; and in this case the second object reproducing the movements of the first object will be given the same direction and will travel a distance and at a rate of speed proportionate and corresponding to the distance and rate of speed traveled by the first object. Where the movements of two or more objects which move without displacement or by displacement are recorded, then not only are the direction and rate of travel of the objects reproduced correspondingly by two or more other objects, but these objects move in synchronism with the differences in the rate of travel of the two or more first objects. The movements of the first objects may be reproduced on the same scale or on proportionately larger or smaller scales. The object of the invention is accomplished by dividing the movements of the objects, whether these movements are in place or by displacement, into their component parts, each part being given a predetermined length which constitutes a unit of distance through which the object must travel before its movement will be recorded.

When the object is moved through a unit of distance, whether in place or in any direction, a recordation of that movement is made. This recordation may be made in various forms. It may conveniently be made by means of perforations or similar impressions upon a tape or other impressionable substance which will later be used to control the mechanism for reproducing the movements of the object.

Where the object moves only in place and it is desired to record the variations in the rate of movement, then the material upon which the record of the movement is made will be moved at a uniform or easily reproduced speed so that the faster the object moves, the greater will be the number of perforations made thereon, and the slower the object moves, the lesser will be the number of perforations made thereon for each unit of length of the substance or for each unit of movement thereof.

Where the object moves by displacement, it may be so mounted that its movements in a forward or backward direction or in a left-hand or right-hand direction will be the movements of a single unit of mechanism; whereas, its movements in all other directions will be the conjoint movements of two or more units of mechanism which have their primary movements in either forward and backward directions or in left-hand and right-hand directions. These four directions are conveniently termed the primary directions.

The recordation of the movement of the object in any of these directions is made by simply recording the direction and distance of travel of the object in the particular direction. The recordation of the movement of the object in any other direction, however, is made by not only recording the direction and distance of travel of the object, but also by recording the difference in the rate of movement of the two or more units of mechanism upon which the object is mounted in order to travel in the given direction. It will be readily seen that if the given direction of travel of the object is half way between two of the primary directions, the two units of mechanism upon which the object is mounted will travel at the same rate of speed; and, further, that if the given direction is one-fourth the angular distance between two adjacent primary directions, one of the units of mechanism will travel at twice the speed of the other. And where the object travels in a curved path, such as the arc of a circle, the variations in the speed of movement of the units of mechanism will not be constant, but will vary according to the point on the arc upon which the object is traveling.

The perforations may be utilized to admit the passage of air under pressure to an air-controlled device in order to govern the operation of the reproducing mechanism. Inasmuch as the number of perforations will be preportionate to the length of time of travel or distance of travel by the object in any direction, the reproducing mechanism will be actuated proportionately to the number of perforations and consequently the secondary movable object or set of objects, forming a part of the reproducing mechanism and by which the movements of the object or objects recorded are reproduced, will be given movements corresponding to the movements of the objects and on any desired scale of proportion. Moreover, where the movements of two or more objects are to be reproduced, the two or more secondary objects forming a part of the reproducing mechanism will be caused to move at speeds proportionate to the speeds of the objects whose movements are recorded and thereby be made to move in directions corresponding to the directions of travel of the first set of objects. Where air under pressure is used to control the reproducing mechanism, it will be obvious that a greater number of perforations will admit more air, and consequently the actuation of the reproducing mechanism will be greater than where a lesser number of perforations admit the air to the reproducing mechanism.

The application of the principle of the invention may be various, but for purposes of illustration its application to the accomplishment of a single purpose is illustrated and described in the following specification:—

Figure 2:
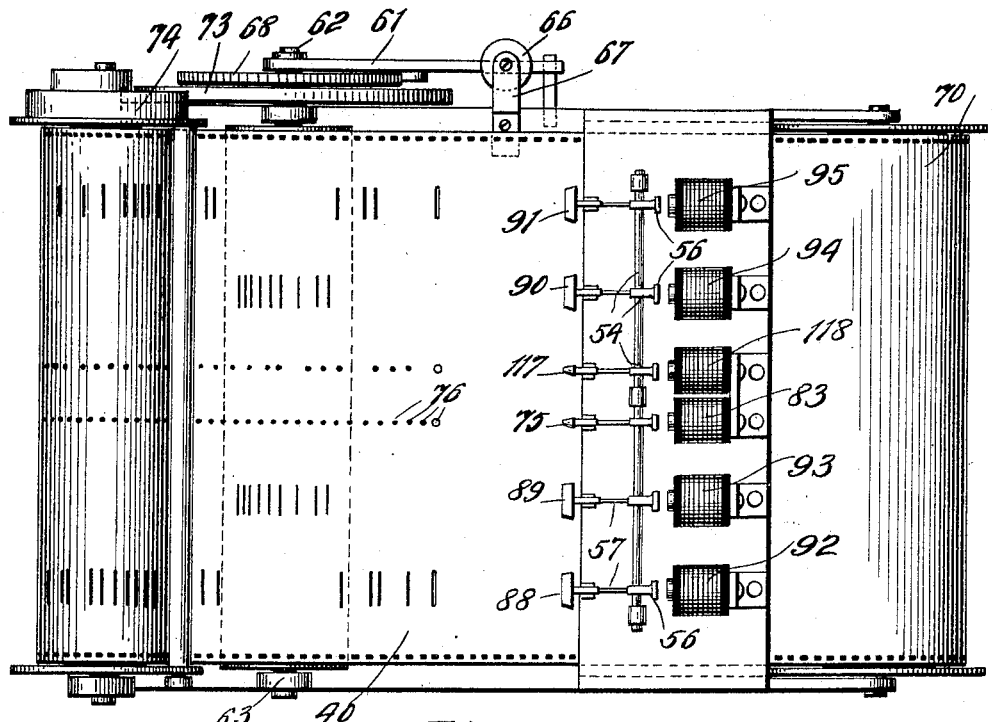

In the accompanying drawings illustrating the preferred form of the invention, Figure 1 is a sectional elevation of the recording apparatus; Fig. 2 is a plan of the parts shown in Fig. 1; Fig. 3 is a sectional elevation of the design follower, showing the method of mounting it; Fig. 4 is an enlarged front elevation of the design-wheel, showing the electrical connections; Fig. 5 is a side elevation of the design-wheel; Fig. 6 is a side elevation of the design-wheel viewed from the opposite direction; Figs. 7 and 8 are enlarged details of one of the tape perforating dies; Fig. 9 is a diagram of the electrical connections; Fig. 10 is a portion of the recording tape, showing a circular design recorded thereon; and Fig. 11 is a design in the form of a circle shown recorded in Fig. 10.

In the illustrated embodiment of the invention the recording apparatus is shown as adapted for recording a design which may be reproduced for any desired purpose. This design is first laid out on an appropriate scale by the designer and may be drawn on any suitable design receiving material. The design is preferably made on such a scale that when it is reproduced, any slight discrepancies in the work of the operator using the recording machine of the apparatus will not be noticeable in the design as reproduced. For example, if the design is drawn on a scale four times larger than the design to be reproduced, it will be recognized that if the workman operating the recording machine follows the lines of the design reasonably closely and accurately, the design as reproduced will be a substantially accurate reproduction of the design drawn by the designer.

The recording apparatus comprises means for following the design to be reproduced and means for recording the movements of the design follower upon a tape by means of perforations thereon. The means for following the design comprises a design-wheel 20 mounted in the lower end of a hollow wheel post 21 secured by braces 22 to a universally mounted carriage. The wheel post 21 is mounted to turn easily by means of upper ball-bearings 24 carried by a lower carriage 23 and lower ball-bearings 25 carried by the braces 22. The carriage 23 is provided with upright standards 26, upon which are journaled wheels 27 arranged to run on tracks 28, supported on the opposite side edges of an upper carriage 29. By means of the wheels 27 the lower carriage 23 is suspended from the upper carriage 29, and may move transversely thereon in opposite directions. The upper carriage is provided with arms 31 carrying wheels 32, which are adapted to run on fixed tracks 33. The above described mounting for the design-wheel is such that the wheel may be moved in forward and backward directions and in right-hand and left-hand directions; and it is thus seen that the lower carriage 23 and the upper carriage 29 constitute the universally movable carriage by which the design-wheel is supported. The design-wheel, moreover, by reason of this mounting, is able to move in two directions at the same moment, so long as those directions are not opposite directions; that is to say, the design-wheel may be moved forward and at the same time in a left-hand direction, or it may be moved forward and at the same time in a right-hand direction, and reversely it may be moved backwardly and in a left-hand direction or it may be moved backwardly and in a right-hand direction. It is thus seen that the design-wheel will follow the outline of any design, however complicated. When following curved lines, it will be recognized that at times two carriages will move equally fast and at other times one of the carriages will move faster than the other. For example, if it is desired to stitch on a quilt a design in the form of a circle, such design being shown in Fig. 11, and it is assumed that the operator in recording the design for its reproduction starts at the point 35 and moves the design-wheel 20 in a left hand direction, the first part of the movement of the universal carriage in following the outline of the circle will be almost entirely by means of the upper carriage 29, the lower carriage 23 having a very slight movement until at least the point 36 is reached. From then on to the point 37, the movement of the lower carriage progressively increases, while the movement of the upper carriage remains substantially constant. From about the point 37 as far as substantially the point 38, the movements of the two carriages are equal and from the point 38 up to the point 39 the movement of the upper carriage 29 progressively decreases. It is thus seen that while the design-wheel is traveling from the point 35 to the point 39 on the circle and a constant and uniform pressure has been exerted upon the wheel post 21 by the operator, the two carriages have been moving at varying rates of speed according to the curvature being followed by the design-wheel. These differences in the rate of movement or rate of speed of the two carriages are so recorded that the machinery controlled by the record for reproducing the design is caused to move (there being at least two separate moving parts in this machinery) at the varying rates of speed of the two carriages and in the same proportion, relation and sequence.

In the illustrated embodiment of the invention, the variations in the speed or rate of movement of the two parts of the universal carriage for supporting the design-wheel are recorded upon a tape 40 by a series of tape perforating dies operated by a tape perforating machine. This tape perforating machine, which is shown in Figs. 1 and 2, comprises a series of tape perforating dies and their actuating mechanism supported on the table 42 of the machine. The female members 43 of the dies are formed in the table 42 and the male members 44 of the dies are supported on the upper end of arms 45 pivoted at 46 on a plate 47 supported from opposite sides of the table 42, and raised from the table so as to afford a space through which the tape will travel. In order that the tape may be perforated while it is in motion, the female die members 43 are mounted in slots in the table 42 (Figs. 7 and 8) and are provided with springs 48, which normally keep them pressed toward the male die members. The male die members are pivotally mounted on the arms 45 and are provided with a spring 49, which normally holds them fixed at right angles to the arms 45 against a stop-pin 50. The tape 40 travels in the direction indicated by the arrows in Figs. 1 and 7, and it is seen by reason of the above described construction that if the act of tape perforation is performed while the tape is moving, the male and female members of the dies will be carried with the tape a short distance against the action of their springs without injuring the slots cut in the tape, after which the springs 48 and 49 return the die members to their normal positions.

The male members of the dies are actuated by a series of magnets 51 (Fig. 1) supported from the plate 47 on uprights 52. When energized, the magnets 51 actuate the armatures 53, which are separately pivoted on a pin or rod 54 extending transversely across the machine and supported from the plate 47 by standards 55. The armatures 53 are in the form of bell-crank levers with their fulcrum 54 relatively close to the head 56, which is the armature proper. The lower ends of the armature arms are connected with the arms 45 by links 57. The point of connection between the links 57 and the arms 45 is relatively close to the pivot 46. It is thus seen that it is only necessary for the armature heads 56 to be separated from the core of the magnets a short distance in order to cause the male members of the dies to descend upon and perforate the tape. When the magnets are no longer energized, springs 58 connecting each armature with the uprights 52 act to restore the parts to their normal positions, as shown in Figs. 1 and 2.

The tape is advanced periodically in accordance with the movements of the design following wheel 20 and is advanced only when the wheel moves. When the wheel is at rest, the tape is at rest. When the wheel is moved through a predetermined angle, the tape is advanced a predetermined length. The means for advancing the tape comprises a pawl 60 mounted on a lever 61 pivoted on the outer end of a shaft 62, journaled in uprights 63, rising from a pocket or depressed portion 64 in the table 42. On its free end, the lever 61 carries an armature 65 placed below the core of a magnet 66 supported by an arm 67 secured to the table 42. A finger 59 secured to the under side of the table 42 acts as a stop for the lever 61 to hold the armature 65 a proper distance from the core of the magnet 66, so that when the magnet is energized and draws the armature 65 into contact with its core the pawl 60 will advance the ratchet wheel 68. The ratchet wheel 68 is secured to the shaft 62 and this shaft also carries a cylinder 69 provided with teeth at its outer ends. These teeth engage with regularly spaced perforations in the margins of the tape. When the magnet 66 is no longer energized, the lever 61 falls by gravity against its stop 59 and the pawl 60 is thereby brought into position to engage a fresh tooth on the ratchet wheel 68. The supply roll 70 of tape is supported at the front end of the machine and as the tape advances it is wound on to a roll 71 at the opposite end of the machine. The tape is kept in engagement with the teeth of the cylinder 69 by means of an idler roll 72 interposed between the cylinder 69 and the roll 71. The roll 71 for the perforated tape is turned to wind up the tape by means of a fly-wheel 73 carried by the shaft 62 engaging a friction pulley 74 carried by the roll 71.

There are six tape perforating dies 44, each of which is separately operable by its corresponding magnet. The die 75 (Fig. 1) is operated each time the tape is advanced a unit in length by the magnet 66, that is to say, each time the design-wheel is turned through a predetermined angle in following the outline of the design. The perforations 76 made by the die 75 in the tape 40 will thus be evenly spaced throughout the length of the tape. The predetermined amount of angular movement of the design-wheel 20 necessary to cause the tape to be advanced a unit of length to cause a single perforation 76 corresponding to that advance to be made in the tape is determined by a series of circuit-making teeth 79 evenly spaced on the periphery of the wheel 20. The material 80 between the teeth 79 is non-conducting or insulating material. When the design-wheel is advanced over the outline of the design, the teeth 79 contact with the two ends 81 of the wires 82 forming the circuit in which the magnet 66 and the magnet 83 for energizing the die 75 are located. When the ends 81 of the circuit wires 82 are in contact with one of the teeth 79, the magnet 66 is energized to advance the tape a unit of length and the magnet 83 is energized to cause the die 75 to make a perforation in the tape. Power for energizing the magnets 66 and 83 and also the magnets for the other tape perforating dies is furnished by the battery 84 (Fig. 9). The design-wheel 20 is so mounted that it can only turn in a forward direction. To prevent it from turning backwardly, a pawl 85 (Fig. 4) carried by the wheel post 21 engages with the teeth on a ratchet wheel 86 secured to the side of the design-wheel 20 concentrically therewith.

When the design-wheel has traveled in a left-hand direction through a predetermined distance, the die 88 is actuated to make a perforation in the tape, and when the design-wheel travels in a right-hand direction the same distance, the die 89 is actuated to perforate the tape. In like manner, when the design-wheel has moved forwardly a predetermined distance, the die 90 is actuated to perforate the tape, and when the wheel travels the same distance in a reverse direction, the die 91 is actuated to perforate the tape. The dies 88, 89, 90, 91 are, respectively, actuated by the magnets 92, 93, 94 and 95. The circuits in which these magnets are placed are normally open circuits. The circuit in which the magnet 92 is placed is closed when the upper carriage 29 is moved sufficiently far in a left-hand direction to cause one of the bar contacts 97, which are spaced equally apart in insulating material resting on the bottom of the carriage 29, to come into contact with and so bridge the two contact plugs 98 inserted in a pivoted shoe 99 composed of insulating material, carried by a post 100 depending from the rail 33. When the carriage 29 moves in a right-hand direction, the friction between the upper surface of the carriage and the under surface of the shoe 99 turns the shoe in the reverse direction and then a second pair of contact plugs 101 are brought into contact with one of the bars 97 so as to be bridged thereby when the carriage 29 has traveled sufficiently far in this direction. The contact between the plugs 101 and one of the bars 97 causes the curcuit in which the magnet 93 is located to be closed. The ends of the wires constituting the circuit in which the magnet 92 for operating the die 88 is placed terminate in the plugs 98, so that when a movement of the carriage 29 in a left-hand direction moves one of the bars 97 into contact with these plugs, this circuit is closed and the magnet 92 energized to operate the die 88 to make a single perforation in the tape. In like manner, the ends of the wires of the circuit in which the magnet 93 is placed terminate in the plugs 101; and when the carriage 29 is moved in a right-hand direction to bring one of the contact bars 97 into contact with the plugs 101, the bridging of the plugs 101 closes the circuit, thereby energizing the magnet 93 to actuate the die 89 to cause a single perforation to be made in the tape. These circuits can be easily traced on the diagram shown in Fig. 9 without further explanation.

When the design-wheel is move in a forward direction, the travel of the lower carriage 23 causes a shoe 103 composed of insulating material pivoted on the arm 104 secured to the under side of the upper carriage 29 to swing so as to bring the contact plugs 107 embedded in the shoe 103 into contact with one of a series of contact bars 105 embedded in a strip of insulating material 106 and resting on the bottom of the carriage 23, thereby closing the circuit in which the magnet 94 is placed. The ends of the wires constituting the circuit in which the magnet 95 is placed terminate in the contact plugs 109, which are also embedded in the insulated shoe 103, so that when the design-wheel is moved in a backward direction and one of the bars 105 is brought into contact with the plugs 109, the bridging of these plugs closes the circuit in which the magnet 95 is placed, thereby energizing the magnet to actuate the die 91 to cause a single perforation to be made in the tape. The shoes 99 and 103 are exactly alike in shape and size, so that although only a side elevation of the shoe 99 and a front elevation of the shoe 103 are given, these two views clearly illustrate the construction and mode of operation of the shoes. In like manner, although only an end elevation of the contact bars 97 is given and only a transverse section of the contact bars 105 is given, these two views are sufficient to illustrate the construction and arrangement of the contact bars 97 and 105, because they are exactly alike in width, length and number.

The perforating of the tape 40 in recording a design in the form of a circle such as that shown in Fig. 11 will be described. The perforations made in the tape in recording this design are shown in Fig. 10. In this figure the tape is represented as traveling in the direction of the arrow. While the design-wheel is moving from the point 35 to the point 36 of the design, as shown in Fig. 11, the carriage 29 is traveling much farther and, therefore, faster in a left-hand direction than the carriage 23 is traveling in a former direction. Consequently, a greater number of the bars 97 are brought into contact with the plugs 98 than bars 105 are brought into contact with the plugs 107. The result is that the circuit of the magnet 92 is closed a greater number of times than the circuit of the magnet 94. Accordingly, the die 88 is actuated to perforate the tape 40 a greater number of times than the die 90 is actuated to perforate the tape. This is clearly represented in the upper part of Fig. 10 where the first column, counting from the left, represents the perforations made by the die 88 and the third column represents the perforations made by the die 90. As the design-wheel moves from the point 36 to the point 37, the carriage 23 is given a greater movement, that is, a faster movement proportionately and the carriage 29 a relatively lessening or slowing up movement, with the result that during this period of travel of the design-wheel, the die 88 makes relatively fewer perforations in the tape and the die 90 makes a greater number of perforations than before. While the design-wheel is traveling from substantially the point 37 to substantially the point 38, both the carriages are moving through equal distances and are moving equally fast, and, consequently, as many bars 97 contact with the plugs 98 as bars 105 contact with the plugs 107. The number of perforations in the first and third columns of the tape during this period of travel of the design-wheel are, therefore, equal. From the point 38 to the point 39 a decreasing movement is imparted to the carriage 29 and an increasing movement is imparted to the carriage 23. This results in a greater number of perforations being made in the third column and a lesser number of perforations being made in the first column. When the point 39 is reached, the design-wheel, of course, ceases to travel in a left-hand direction, so that no further perforations are made in the first column. As the design-wheel travels from the point 39 to about the point 110, the carriage 23 is moving through a relatively great distance at a relatively fast speed, and the carriage 29 begins to travel in a right-hand direction. This difference in the rate of movement between the two carriages as the design-wheel follows this part of the design is indicated by the perforations made during this time in columns 3 and 2, the first perforations in the column 2 being those made as the carriage 29 begins to move in a right-hand direction. The rest of the movements of the two carriages while the design-wheel is following the remainder of the design will be readily understood from a study of Figs. 10 and 11 without further detailed explanation. As the design-wheel approaches the forty-five degree angle 111, it is obvious the two carriages are moving through a uniform distance at uniform speed. This is indicated by the uniformly spaced perforations at the points 112 in columns 2 and 3. As the design-wheel approaches the point 113, the carriage 29 moves through a greater distance and so faster than the carriage 23. This is indicated by the greater number of perforations at the point 114 in column 2 than there are perforations at the corresponding point in column 3. When the point 114 is reached, the carriage 23 no longer travels in a forward direction, but begins to travel in a backward direction, first very slowly, then increasingly faster, until the point 115 is reached. At this point, the carriage 29 reverses its direction of movement and starts to move in a left-hand direction, at first slowly and then increasingly fast until the point 35 is again reached, the movements of the carriage 29 while the design-wheel is traveling from the point 115 to the point 35 being indicated at the bottom of the first column.

While the design-wheel is following the outlines of the design and is constantly turning in one direction only, with the wheel as nearly in alinement with the outline of the design as the operator can keep it, the design-wheel support 21 is turned completely around in following the outline of a design such as that shown in Fig. 11. During this time the pawl 66 and the die 75 are actuated for every unit of angular space through which the design-wheel moves the former to advance the tape a unit of length and the latter to make a perforation 76 corresponding thereto.

Not only does the recording machine make perforations in the tape 40 corresponding to and indicating the travel of the design-wheel and the movement of the carriages 29 and 23 but the recording machine also records on the tape the periods of time during which the reproducing machine for reproducing the design should be in operation. It will be readily understood that it might be necessary or desirable to move the design-wheel from one part of a design to another, and that during this interval of travel no reproduction should be made by the reproducing machine. It would be necessary, however, to cause the reproducing machine to move from the point at which its reproducing is stopped to the point at which the reproducing is again commenced. This would be done, of course, by having the necessary perforations made on the tape. In order that the reproducing machine may be automatically controlled either to reproduce the design or to be held from operating, the recording machine is provided with means under the control of the operator to record on the tape 40 the periods of time during which and during which only the reproducing machine shall be in operation.

For the purpose of causing the reproducing machine to operate at the requisite times, a die 117 is provided and arranged to be operated by a magnet 118. The one wire of the circuit in which the magnet 118 is located is formed by the wire 119, which is conducted from the recording machine down to the design-wheel through the hollow wheel post 21 and ends as a terminal contact 120 (Fig. 4) secured to the lower end of the post 21. When the switch is in normal position, as shown in Fig. 5, the circuit in which the magnet 118 is placed is completed through the finger 122 of a switch 121 contacting with one of the teeth 79 of the wheel 20. When the switch 121 is in normal position and its finger 122 is in contact with one of the teeth 79 of the wheel 20, the contact ends 81 of the circuit 82 are in contact with another one of the teeth 79, so that the current passing down through the wire 119, thence into the switch 121, into the wheel 20, is conducted back through the neutral wire 123 of the circuit 82, as clearly indicated in Fig. 9. While the reproducing machine is to be operated to stitch the quilt, the operator keeps the switch 121 in the position shown in Fig. 5, and when the switch is in this position the indicator finger 124 thereof occupies a vertical position, pointing at right angles toward the design. If, now, the operator has reached a point in the design where it is desirable or necessary that the reproducing machine should not operate in reproducing the design, the operator turns the switch by means of its handle 125 so as to break its contact with the terminal 120. The further movements of the design-wheel in following the design or in moving from one part of the design to another, or in moving from one design to a separate design, will result in the actuation of the magnets 66 and 83 to advance the tape 40 and make the perforations 76 therein, but it will not result in the actuation of the die 117. When the tape with the record of the design on it is placed in the reproducing machine and the blank space on the tape is reached, caused by the opening of the switch 121, the reproducing machine will not operate to reproduce the design although the reproducing machine will reproduce the movements of the two carriages 29 and 23. When the operator has moved the design-wheel to the point on his design where the reproducing is to be recommenced, he throws the switch 121 into normal position again with the finger 124, pointing at right angles to the design. Thereafter, the die 117 is actuated to make a perforation in the tape for each unit of angular space through which the design-wheel moves.

When the complete design has been recorded upon the tape 40 by means of the perforations made by the dies 88, 89, 90, and 91, the roll of tape is removed from the recording machine and placed in the reproducing machine, where the perforations in the tape are utilized to cause a second set of movable objects corresponding to the movable objects or carriages 23 and 29 to move or travel in such manner that they reproduce the path of movement or travel described by the design-wheel 20. It was pointed out in connection with the description of the movements of the design-wheel in following the design that at times the two carriages 23 and 29 were caused to move at different rates of speed and that at other times they were caused to move at equal rates of speed. These rates of speed are synchronized in the movable objects corresponding respectively to the two carriages, so that the object corresponding to the carriage 23 moves at rates of speed corresponding to the speed of the carriage 23, and the object corresponding to the carriage 29 moves at rates of speed corresponding to the speed of the carriage 29. The differences in the rates of speed of the movable objects corresponding to the carriages 23 and 29, therefore, are proportionate to the differences of the rates of speed of movement maintained by carriages 23 and 29 in describing the path of the design followed by the design-wheel.

In the foregoing description of the illustrated embodiment of the invention, the movable object whose movements are recorded and then reproduced moves by displacement. If, now, the object moves in place alone, for example, if the movable object is the design-wheel and it is so mounted that it can turn at varying rates of speed and yet without displacement, its rotations will still result in the actuation of the die 75. If these rotations of the wheel were still availed of to cause the travel of the tape through the recording machine, the perforations 76 would still correspond to each unit of length of the tape, and in that case the variations in the speed of the rotation of the wheel would not be recorded. Consequently, in recording the variations in the speed of rotation of the wheel, it would be necessary to move the tape through the recording machine not by the magnet-controlled pawl, which depends upon the rotation of the wheel itself, but by an independent mechanism which will impart to the tape a uniform or easily reproduced rate of travel, regardless of the speed of rotation of the wheel. By causing the tape with the record of the variations in the rate of rotation of the wheel to pass through the reproducing machine at the same rate of travel it passed through the recording machine, the variations in the rate of rotation of the wheel will be reproduced.

Having thus indicated the nature of the present invention and described an illustrated embodiment of mechanism to which the invention is applied, in order to explain its principles,—and it will be understood that the invention is not to be restricted in its application to the apparatus shown and described, but that the true scope of the invention is to be determined by the following claims, what I claim as new and desire to secure by Letters-Patent is:—

1. A recording apparatus having, in combination, a design-wheel adapted to follow the outlines of a design, a carriage upon which the design-wheel is mounted arranged for movements in forward and backward directions, a second carriage upon which the first is mounted arranged for movements in left and right hand directions and a tape perforating machine comprising a series of dies, means for actuating them, means for advancing the tape and connections between the design-wheel and the tape perforating machine by which the tape is advanced and the dies actuated according to the movements of the design-wheel.

2. A recording apparatus having, in combination, a design-wheel adapted to follow the outlines of a design, a universally movable carriage upon which the design-wheel is mounted and a tape perforating machine comprising a series of dies, means for actuating the dies, means for advancing the tape and connections between the design-wheel and the tape perforating machine by which the dies are actuated according to the movements of the design-wheel.

3. A recording apparatus having, in combination, a design-follower, a universally movable carriage upon which the design-follower is mounted, and a tape perforating machine constructed and arranged for making rows of perforations in the tape corresponding to the movements of the design-follower.

4. A recording apparatus having, in combination, a design-wheel, a carriage movable in forward and backward directions upon which the design-wheel is mounted, a second carriage movable in directions at right angles to the movements of the first carriage and upon which the first carriage is mounted, a tape perforating machine, means for advancing the tape, a series of dies, and electrical connections between the carriages and the perforating machine controlled by the movements of the carriages for actuating the dies proportionately to the distance traveled in any direction by the design-wheel.

5. A recording apparatus having, in combination, a design-follower, means movable in four primary directions for supporting the design-follower, a tape perforating machine having means for making four rows of perforations corresponding to the primary movements of the design-follower and means for actuating the dies and advancing the tape to correspond to the extent of movement of the design-follower in any direction.

6. A recording apparatus having, in combination, a design-wheel adapted to follow the outlines of a design, a universally movable carriage for supporting the design-wheel, means for recording each unit of movement of the design-wheel in any direction.

7. A recording apparatus having, in combination, a design-wheel adapted to follow the outlines of a design, a universally movable carriage for supporting the design-wheel, a tape perforating machine and means for perforating the tape for each unit of movement of the design-wheel in any direction.

8. A recording apparatus having, in combination, a design-wheel, a carriage movable in forward and backward directions upon which the design-wheel is mounted, a series of evenly spaced electrical contacts on the carriage, a second carriage movable in directions at right angles to the movements of the first carriage and upon which the first carriage is mounted, a series of electrical contacts on the second carriage, a perforating machine, a series of dies for perforating the tape and electrical connections between the dies and the carriages whereby the dies perforate the tape according to the movements of the design-wheel through distances corresponding to the spacing of the electrical contacts on the carriages.

9. A recording apparatus having, in combination, a design-wheel composed of evenly spaced contact points on its periphery, two carriages movable at right angles to each other for supporting the design-wheel, evenly spaced contact points on each carriage and a tape perforating machine comprising means for advancing the tape and a series of dies for perforating the tape, connections between the design-wheel and the tape advancing means for advancing the tape proportionately to the rotations of the design-wheel, and connections between the carriages and the dies for actuating the dies proportionately to the movements of the carriages.

10. A recording apparatus having, in combination, a design-follower, a universally movable carriage for supporting the design-follower, means for recording the movements of the design-follower, and means for actuating the recording means when the design-follower is moved through a unit of space in any direction.

11. A recording apparatus having, in combination, a plurality of movable objects capable of following the outlines of a given design, means for moving the objects to describe the path of the design, a record blank upon which the movements of the objects are recorded as impressions made on the blank, means for recording the impressions on the blank, and operative connections between the movable objects and the means for recording the impressions.

12. A recording apparatus having, in combination, a movable object capable of moving at different rates of speed, means for making a record of the variations of speed at which the object moves and operative connections between the movable objects and the record making means.

13. A recording apparatus having, in combination, a plurality of movable objects movable at different rates of speed, means for recording the differences in the rates of speed of the movable objects and operative connections between the movable objects and the recording means.

14. A recording apparatus having, in combination, a plurality of movable objects movable at different rates of speed, means for recording the rate, direction and distance of travel of the objects, and operative connections between the movable objects and the recording means.

15. A recording apparatus having, in combination, a design-wheel having a series of evenly spaced contact points on its periphery, means for supporting the design-wheel having evenly spaced contact points, a tape perforating machine, means for advancing the tape, a series of dies for perforating the tape, means for actuating the dies, connections between the design-wheel and the tape advancing machine and connections between the design-wheel supporting means and the means for actuating the dies.

EUGÈNE VIOLLET.